US010710665B2

(12) United States Patent
Matsuo et al.

(10) Patent No.: US 10,710,665 B2
(45) Date of Patent: Jul. 14, 2020

(54) VEHICLE BODY FRAME STRUCTURE FOR SADDLE RIDING TYPE VEHICLE

(71) Applicant: HONDA MOTOR CO., LTD., Minato-ku, Tokyo (JP)

(72) Inventors: Tomoya Matsuo, Wako (JP); Shinya Morooka, Wako (JP); Hikaru Tsuchihashi, Wako (JP); Yohei Suzuki, Wako (JP); Tomohiko Yashiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 15/697,918

(22) Filed: Sep. 7, 2017

(65) Prior Publication Data

US 2018/0072368 A1    Mar. 15, 2018

(30) Foreign Application Priority Data

Sep. 9, 2016    (JP) .................................. 2016-177092

(51) Int. Cl.
*B62K 11/02* (2006.01)
*B62K 11/04* (2006.01)
(Continued)

(52) U.S. Cl.
CPC ................. *B62K 11/02* (2013.01); *B62J 1/08* (2013.01); *B62J 99/00* (2013.01); *B62K 11/04* (2013.01); *B62K 19/16* (2013.01); *B62J 1/12* (2013.01)

(58) Field of Classification Search
CPC ........ B62K 11/02; B62K 11/04; B62K 19/16; B62K 19/30; B62K 19/48; B62K 2208/00;
(Continued)

(56) References Cited

U.S. PATENT DOCUMENTS 4,881,614 A * 11/1989 Hoshi .................... B62K 11/04
180/225
8,905,178 B2 * 12/2014 Matsushima .......... B62K 11/00
180/219
(Continued)

FOREIGN PATENT DOCUMENTS

| JP | S58-049581 A | 3/1983 |
| JP | 2015-016750 A | 1/2015 |
| JP | 2015-051664 A | 3/2015 |

OTHER PUBLICATIONS

Machine Translation of JP 2015016750 A (Year: 2015).*
(Continued)

*Primary Examiner* — Barry Gooden, Jr.
(74) *Attorney, Agent, or Firm* — Carrier Blackman & Associates, P.C.; William D. Blackman; Joseph P. Carrier

(57) ABSTRACT

A vehicle body frame structure for a saddle riding type vehicle, the vehicle body frame structure includes main frames formed by coupling main tubes extending rearwardly downward from a head pipe supporting a front wheel via a front fork to pivot frames supporting a rear fork by rear end portions of the pivot frames, and a rear frame in a rear of the main frames, the rear frame being formed of a fiber reinforced resin and supporting a seat. The rear frame includes upper side attaching portions attached to the main frames, a pair of left and right upper side portions linearly extending rearward from the upper side attaching portions, and a cross member laterally coupling the upper side portions to each other. The cross member includes a bulging portion bulging above the upper side portions.

10 Claims, 8 Drawing Sheets

(51) Int. Cl.
  *B62J 99/00* (2020.01)
  *B62K 19/16* (2006.01)
  *B62J 1/08* (2006.01)
  *B62J 1/12* (2006.01)
(58) Field of Classification Search
  CPC ......... B62J 1/00; B62J 1/08; B62J 1/12; B62J 1/28
  See application file for complete search history.

(56) References Cited

U.S. PATENT DOCUMENTS

| | | | |
|---|---|---|---|
| 9,061,579 B2* | 6/2015 | Yamagishi | B60K 13/02 |
| 9,181,908 B2* | 11/2015 | Tani | F02M 35/162 |
| 9,291,130 B2* | 3/2016 | Matsushima | F02M 35/162 |
| 9,315,228 B2* | 4/2016 | Nishimura | B60K 13/02 |
| 9,689,355 B2 | 6/2017 | Matsushima et al. | |
| 9,902,458 B2* | 2/2018 | Matsushima | B62K 11/04 |
| 9,908,581 B2* | 3/2018 | Tada | B62K 11/04 |
| 10,118,567 B2* | 11/2018 | Hosoya | B60R 13/00 |
| 2013/0240276 A1* | 9/2013 | Matsushima | B62J 17/00 180/68.3 |
| 2015/0060177 A1* | 3/2015 | Matsushima | B62K 19/16 180/219 |
| 2015/0060178 A1* | 3/2015 | Matsushima | F02M 35/048 180/219 |
| 2016/0200387 A1 | 7/2016 | Matsushima | |
| 2017/0029062 A1* | 2/2017 | Tada | B62J 1/08 |
| 2018/0093734 A1* | 4/2018 | Matsuo | B62K 11/04 |

OTHER PUBLICATIONS

Extended European search report dated Jan. 24, 2018 in the corresponding EP Patent Application 17 18 9972.7.
Office Action dated Jun. 26, 2018 in the corresponding Japanese Patent Application No. 2016-177092 with the English translation thereof.
Australian Office Action dated Oct. 23, 2018 in the corresponding patent application 2017225126.

* cited by examiner

VEHICLE BODY FRAME STRUCTURE FOR SADDLE RIDING TYPE VEHICLE

INCORPORATION BY REFERENCE

The present application claims priority under 35 U.S.C. § 119 to Japanese Patent Application No. 2016-177092 filed on Sep. 9, 2016. The content of the application is incorporated herein by reference in its entirety.

TECHNICAL FIELD

The present invention relates to a vehicle body frame structure for a saddle riding type vehicle.

BACKGROUND ART

In a conventionally known vehicle body frame structure for a saddle riding type vehicle, a rear frame formed of a fiber reinforced resin and supporting a seat is attached from the rear to main frames extending rearwardly downward (see Patent Document 1, for example).

PRIOR ART DOCUMENT

Patent Document

[Patent Document 1]
Japanese Patent Laid-Open No. 2015-51664

SUMMARY OF THE INVENTION

Problem to be Solved by the Invention

In the constitution of Patent Document 1, an attaching part where the rear frame is attached to the main frames extending rearwardly downward is disposed at a high position. Thus, the rear frame can support the seat at an appropriate position. However, the attaching part is increased in longitudinal size, and thus weight is increased.

The present invention has been made in view of the above-described situation. It is an object of the present invention to be able to miniaturize an attaching part attaching a rear frame to main frames and support a seat well.

Means for Solving the Problem

In order to achieve the above object, according to an aspect of the present invention, there is provided a vehicle body frame structure for a saddle riding type vehicle, the vehicle body frame structure including a main frame (18) formed by coupling a main tube (22) extending rearwardly downward from a head pipe (17) supporting a front wheel (2) via a front fork (11) to a pivot frame (23) supporting a rear fork (12) by rear end portions of the pivot frame (23), and a rear frame (16) in a rear of the main frame (18), the rear frame (16) being formed of a fiber reinforced resin and supporting a seat (13). The rear frame (16) includes attaching portions (79) attached to the main frame (18), a pair of left and right upper side portions (73) linearly extending rearward from the attaching portions (79), and a cross member (74) laterally coupling the upper side portions (73) to each other. The cross member (74) includes a bulging portion (100) bulging above the upper side portions (73).

According to the aspect of the present invention, the rear frame formed of a fiber reinforced resin and supporting the seat includes the attaching portions attached to the main frame extending rearwardly downward, the pair of left and right upper side portions linearly extending rearward from the attaching portions, and the cross member laterally coupling the upper side portions to each other. The cross member includes the bulging portion bulging above the upper side portions. Thus, the seat can be supported well by the bulging portion bulging above the upper side portions. Further, because the bulging portion supports the seat, the position of the attaching portions can be lowered, and the attaching portions come closer to the main frame. It is therefore possible to miniaturize the attaching portions and parts on the side of the main frame, to which parts the attaching portions are attached.

In addition, in the vehicle body frame structure according to an aspect of the present invention, an inside of the rear frame (16) may constitute an air chamber of an engine (10).

According to the aspect of the present invention, the inside of the rear frame constitutes the air chamber of the engine. Thus, there is no need to provide a dedicated member for forming the air chamber, and the structure can be simplified.

In addition, in the vehicle body frame structure according to an aspect of the present invention, a locking portion (103) locking the seat (13) may be disposed on an upper surface of the bulging portion (100).

According to the aspect of the present invention, the locking portion locking the seat is disposed on the upper surface of the bulging portion. Thus, the seat can be supported and locked by the bulging portion, so that the seat can be fixed with a simple structure.

Further, in the vehicle body frame structure according to an aspect of the present invention, the rear frame (16) may include a pair of left and right side walls (70) and a front wall (71) disposed between the side walls (70), and an intake air passage (63) coupled to the engine (10) and an air cleaner element (60) may be attached to the front wall (71).

According to the aspect of the present invention, the intake air passage coupled to the engine and the air cleaner element are attached to the front wall disposed between the pair of left and right side walls. Thus, the intake air passage and the air cleaner element can be attached with a simple structure using the front wall.

In addition, in the vehicle body frame structure according to an aspect of the present invention, an opening (104) making an inside and an outside of the rear frame (16) communicate with each other may be formed in a side wall portion (101) of the bulging portion (100).

According to the aspect of the present invention, the opening making the inside and outside of the rear frame communicate with each other is formed in the side wall portion of the bulging portion. Thus, an air can be taken into the air chamber from the opening of the side wall portion, so that air intake efficiency can be improved.

In addition, in the vehicle body frame structure according to an aspect of the present invention, a collar (80a) formed of a conductive metal may be disposed in a coupling portion (80) coupling the rear frame (16) and the main frame (18) to each other, and the collar (80a) may have a connecting portion (80b) to which a ground wire (64a) of a battery (64) included in the rear frame (16) is connected.

According to the aspect of the present invention, the conductive collar disposed in the coupling portion coupling the rear frame and the main frame to each other has the connecting portion to which the ground wire of the battery included in the rear frame is connected. Therefore, even in the constitution in which the battery is included in the rear frame made of a fiber reinforced resin, the ground wire can be connected to a conductive part by a simple structure, by connecting the ground wire to the collar disposed in the coupling portion.

In addition, in the vehicle body frame structure according to an aspect of the present invention, a slit (73a) may be arranged in front portions of the upper side portions (73), and a locking piece (50a) extending from a radiator shroud (50) may be fitted in the slit (73a).

According to the aspect of the present invention, the locking pieces extending from the radiator shrouds are fitted in the slits in the front portions of the upper side portions. Thus, the radiator shrouds can be supported by the rear frame with a simple constitution.

Further, in the vehicle body frame structure according to an aspect of the present invention, the rear frame (16) may include a rear wall (72) laterally coupling rear portions of the side walls (70) to each other, the rear wall (72) may constitute a front portion of a rear fender (54) and is provided with a rear fender rear portion (93) extending rearward from an upper portion of the rear wall (72), a rear cross member (75) laterally coupling the upper side portions (73) to each other may be disposed at a position spaced above from the rear wall (72), and an outside air introducing passage (94) may be formed between the rear wall (72) and the rear cross member (75).

According to the aspect of the present invention, the rear wall of the rear frame constitutes the front portion of the rear fender, the rear cross member laterally coupling the upper side portions to each other is disposed at a position spaced above from the rear wall, and the outside air introducing passage is formed between the rear wall and the rear cross member. Thus, the structure can be simplified by making the rear wall have the function of a rear fender, and rigidity of the rear frame can be improved by the rear wall and the rear cross member. Further, an air can be taken into the air chamber from the outside air introducing passage between the rear wall and the rear cross member, so that air intake efficiency can be improved.

In addition, in the vehicle body frame structure according to an aspect of the present invention, the slit (73a) may be disposed in a part of each of the upper side portions (73) respectively, the parts being adjacent to, and situated laterally in a vehicle width direction, in relation to the bulging portion (100).

According to the aspect of the present invention, the slits are disposed in the parts of the upper side portions, the parts being adjacent to, and situated laterally in a vehicle width direction, in relation to the bulging portion. Thus, the bulging portion can be covered and concealed by the radiator shrouds, so that good external appearance quality is obtained.

Effects of the Invention

In the vehicle body frame structure according to the aspect of the present invention, it is possible to support the seat well by the bulging portion of the rear frame, and it is possible to miniaturize the attaching portions of the rear frame and the parts on the side of the main frames, to which parts the attaching portions are attached.

In addition, there is no need to provide a dedicated member for forming the air chamber, and the structure can be simplified.

In addition, the seat can be fixed by the locking portion of the bulging portion with a simple structure.

In addition, the intake air passage and the air cleaner element can be attached with a simple structure using the front wall.

Further, air intake efficiency can be improved by the openings in the side wall portions of the bulging portion.

In addition, the ground wire can be connected to the conductive part with a simple structure using the collar of the coupling portion.

In addition, the radiator shrouds can be supported by the rear frame with a simple constitution.

In addition, the structure can be simplified by making the rear wall have the function of a rear fender, and rigidity of the rear frame can be improved by the rear wall and the rear cross member. Further, air intake efficiency can be improved by the outside air introducing passage in the rear frame.

Further, the bulging portion can be covered and concealed by the radiator shrouds, so that good external appearance quality is obtained.

MODE FOR CARRYING OUT THE INVENTION

An embodiment of the present invention will hereinafter be described with reference to the drawings. Incidentally, in the description, directions such as front and rear, left and right, and up and down are the same as directions with respect to a vehicle body unless otherwise specified. In addition, symbol FR depicted in the respective figures indicates a forward direction of the vehicle body, symbol UP indicates an upward direction of the vehicle body, and symbol LH indicates a leftward direction of the vehicle body.

Figure 1:
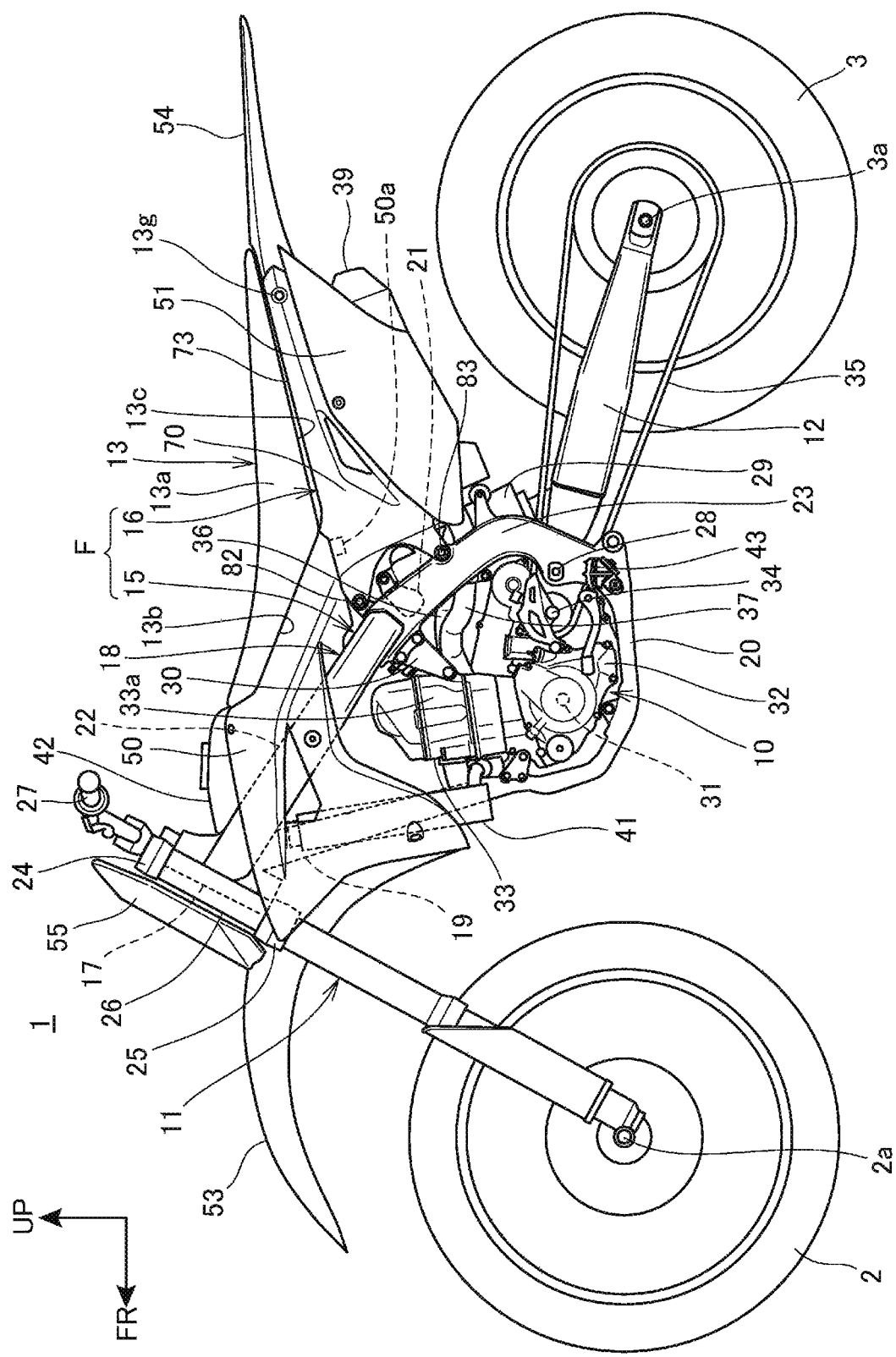
FIG. 1 is a left side view of a motorcycle according to an embodiment of the present invention.
Figure 2:
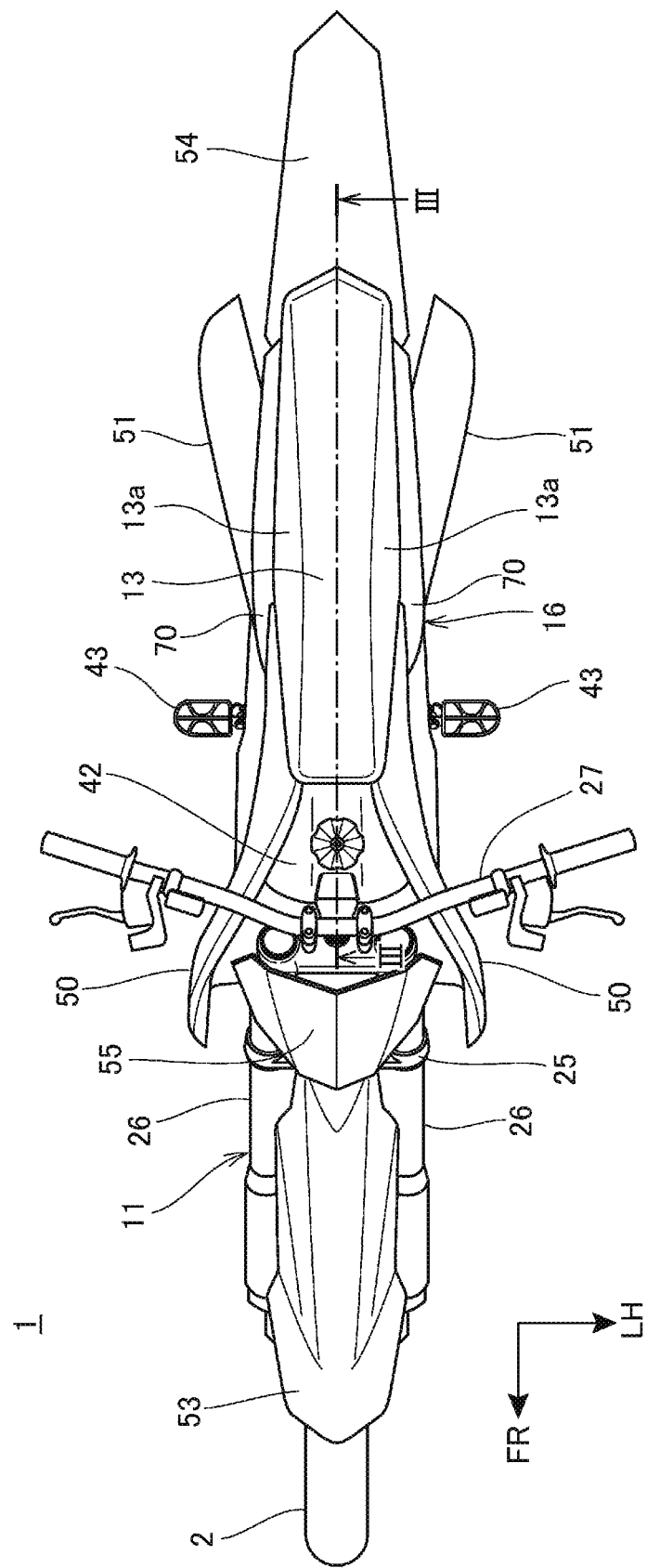
FIG. 2 is a plan view of the motorcycle as viewed from above.

FIG. 1 is a left side view of a motorcycle 1 according to an embodiment of the present invention. FIG. 2 is a plan view of the motorcycle 1 as viewed from above. It is to be noted that FIG. 1 depicts only left side parts, including reference symbols, of parts provided as left-right pairs.

The motorcycle 1 is a vehicle in which an engine 10 as a power unit is supported by a vehicle body frame F, a front fork 11 steerably supporting a front wheel 2 is steerably supported by a front end of the vehicle body frame F, and a rear fork 12 supporting a rear wheel 3 is disposed on a rear side of the vehicle body frame F. The motorcycle 1 is a saddle riding type vehicle in which a seat 13 that a driver is seated so as to straddle is disposed above a rear portion of the vehicle body frame F.

The vehicle body frame F includes a front frame 15 that supports the engine 10 as an internal combustion engine and a rear frame 16 that extends rearward from the front frame 15.

The front frame 15 includes a head pipe 17 disposed at a front end, a pair of left and right main frames 18, a down frame 19, a pair of left and right lower frames 20, and a cross frame 21 coupling the main frames 18 to each other in a vehicle width direction. The front frame 15 is for example formed of a metal such as an aluminum alloy or the like, and thus has conductivity.

Specifically, the main frames 18 integrally include a pair of left and right main tubes 22 that extend rearwardly downward from a rear surface of the head pipe 17, and a pair of left and right pivot frames 23 that extend rearwardly downward from rear ends of the main tubes 22 at a steeper inclination than that of the main tubes 22. Front end portions of the main frames 18 extend rearwardly downward while widening a space therebetween in the vehicle width direction. Rear portions of the main frames 18 extend rearwardly downward substantially in parallel with each other.

The down frame 19 has an upper end portion thereof connected to a rear portion of the head pipe 17 and front end portions of the main frames 18 so as to be located at a position under the main frames 18. The down frame 19 extends rearwardly downward at a steeper inclination than that of the main frames 18. The down frame 19 is one frame extending in a center in the vehicle width direction.

The pivot frames 23 extend downward from the rear ends of the main tubes 22 at a larger rearwardly downward inclination than that of the main tubes 22. The cross frame 21 couples upper end portions of the pivot frames 23 to each other in the vehicle width direction.

The lower frames 20 branch left and right from a lower end portion of the down frame 19 and each extend downward, then bend and extend rearward, and are connected to lower end portions of the pivot frames 23.

The rear frame 16 has a front end portion thereof connected to rear portions of the main frames 18, and extends rearward.

The front fork 11 includes a steering shaft 17a (FIG. 3) rotatably supported by the head pipe 17, a top bridge 24 fixed to an upper end of the steering shaft 17a, a bottom bridge 25 fixed to a lower end of the steering shaft 17a, and fork tubes 26 disposed as a pair on the left and right of the head pipe 17 and supported by the top bridge 24 and the bottom bridge 25.

The front wheel 2 is rotatably supported by a front wheel axle 2a disposed at lower end portions of the fork tubes 26. Handlebars 27 used by the driver to steer the front wheel 2 are attached to the top bridge 24.

The rear fork 12 formed in the shape of an arm extending rearward has a front end portion thereof rotatably supported by a pivot shaft 28 coupling rear end portions of the left and right pivot frames 23 to each other in the vehicle width direction. The rear fork 12 thus vertically swings about the pivot shaft 28. The rear wheel 3 is rotatably supported by a rear wheel axle 3a inserted through rear end portions of the rear fork 12.

A rear suspension 29 is stretched between a front portion of the rear fork 12 and the cross frame 21.

The engine 10 is disposed inside the front frame 15 formed in a frame shape as viewed from the side. The engine 10 is supported by the front frame 15. An engine hanger 30 extending forwardly downward is fixed to vertically intermediate portions of the main frames 18.

The engine 10 includes a crankcase 32 supporting a crankshaft 31 extending in the vehicle width direction and a cylinder portion 33 extending upward from a front portion of the crankcase 32. A transmission is included in a rear portion of the crankcase 32. The engine 10 is of a water-cooled type.

A front end portion of the engine hanger 30 is connected to a rear portion of a cylinder head 33a of the cylinder portion 33.

The output of the engine 10 is transmitted to the rear wheel 3 by a chain 35 wound between an output shaft 34 of the transmission of the engine 10 and the rear wheel 3.

Figure 3:
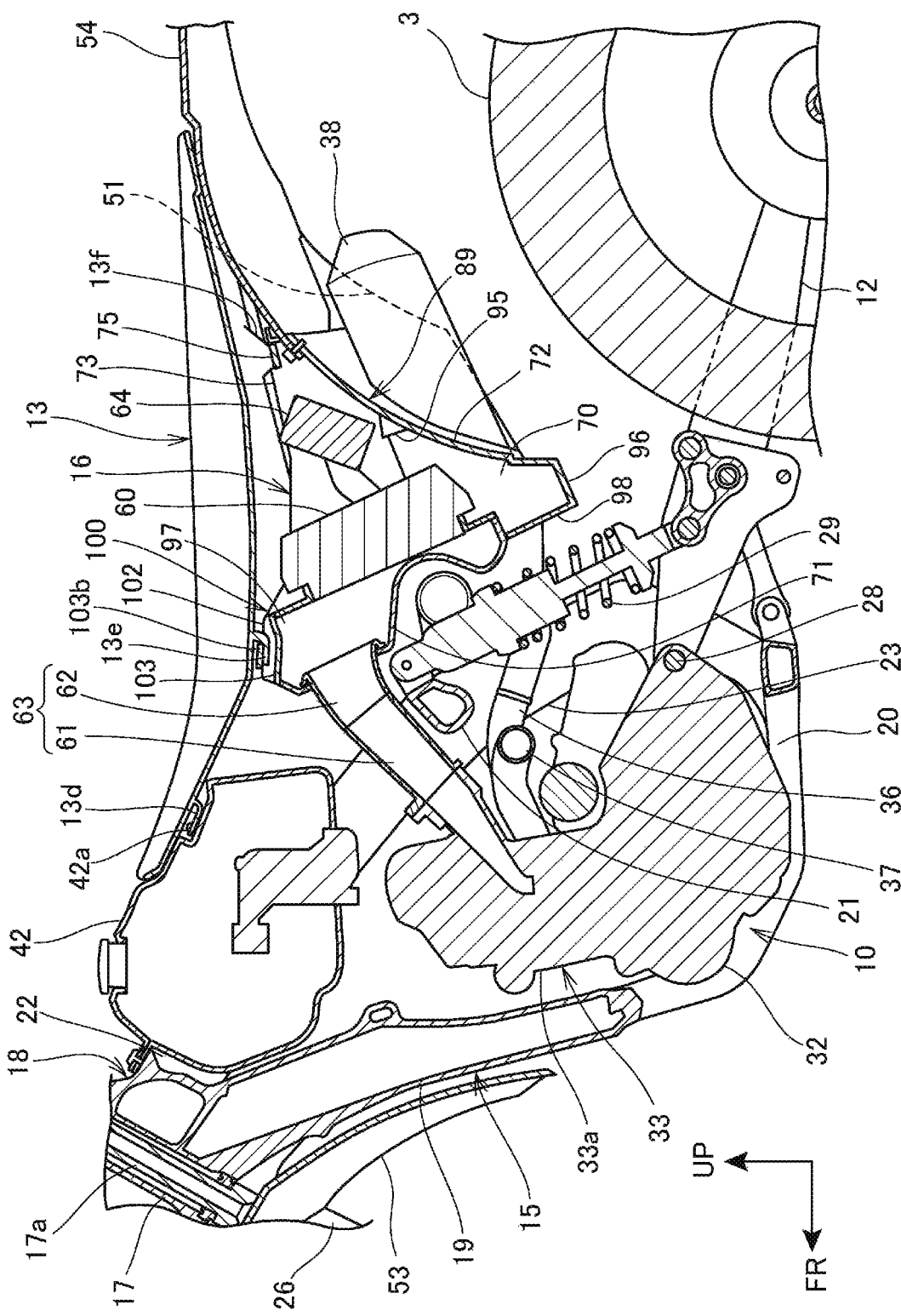
FIG. 3 is a sectional view taken along a line of FIG. 2.

An exhaust pipe of the engine 10 is drawn out frontward from an exhaust port of a front surface of the cylinder head 33a, extends on one side (right side) in the vehicle width direction, then bends rearward, extends rearward while passing the right side of the cylinder portion 33, and branches into a one-side exhaust pipe 36 on the right side and an other-side exhaust pipe 37 on the left side in the rear of the cylinder portion 33. The one-side exhaust pipe 36 extends rearward while passing the right side of the vehicle body, and is connected to a one-side muffler 38 (FIG. 3). The other-side exhaust pipe 37 extends rearward while passing the left side of the vehicle body, and is connected to an other-side muffler 39. The one-side muffler 38 and the other-side muffler 39 are disposed above the rear wheel 3 so as to be separated from each other on the left and right of the rear wheel 3.

The motorcycle 1 includes a pair of left and right plate-shaped radiators 41 that radiate the heat of cooling water of the engine 10. The radiators 41 are disposed in front of the cylinder portion 33 so as to be separated from each other on the left and right sides of the down frame 19. The radiators 41 are arranged upright such that heat radiating surfaces of the radiators 41, the heat radiating surfaces being surfaces in a plate thickness direction, face the front side of the motorcycle 1.

A fuel tank 42 is disposed between the head pipe 17 and the seat 13 and between the left and right main frames 18. The fuel tank 42 is supported by the main frames 18. An upper portion of the fuel tank 42 bulges upwardly of upper surfaces of the main frames 18.

The seat 13 extends rearward from a rear portion of the fuel tank 42 along an upper surface of the rear frame 16. The seat 13 is supported from below by the fuel tank 42 and the rear frame 16.

Steps 43 on which the driver rests feet are provided as a left-right pair to the lower end portions of the pivot frames 23.

The motorcycle 1 includes a pair of left and right radiator shrouds 50 and a pair of left and right side covers 51 as vehicle body covers covering the vehicle body.

The radiator shrouds 50 are plate-shaped covers that cover the radiators 41, an upper portion of the down frame 19, the main tubes 22, and the fuel tank 42 from the outside. The radiator shrouds 50 are fixed to the radiators 41, the main tubes 22, and the fuel tank 42 by fixtures.

The side covers 51 individually cover the one-side muffler 38 and the other-side muffler 39 from the outside. The side covers 51 are attached to outside surfaces of the rear frame 16.

The radiator shrouds 50 and the side covers 51 are formed of a fiber reinforced resin.

As depicted in FIG. 1 and FIG. 2, both side surface portions 13a in the vehicle width direction of the seat 13 are inclined such that size in the vehicle width direction of the seat 13 increases toward a lower side. The two side surface portions 13a are smoothly continuous with outside surfaces of rear portions of the radiator shrouds 50 and the outside surfaces of the rear frame 16. Therefore, the driver seated on the seat 13 is prevented from being caught by uneven surfaces, and the driver can change a riding position easily.

In addition, the motorcycle 1 includes a front fender 53 that is attached to the front fork 11 and covers the front wheel 2 from above, a rear fender 54 that covers the rear wheel 3 from above, and a front cover 55 that covers upper portions of the fork tubes 26 from the front.

The front fender 53 and the front cover 55 are formed of a resin such as polypropylene or the like.

FIG. 3 is a sectional view taken along a line of FIG. 2.

An intake device of the engine 10 includes the above-described rear frame 16 functioning as an air cleaner box, an air cleaner element 60 disposed in an air chamber within the rear frame 16, a throttle body 61 connected to an intake port of a rear surface of the cylinder head 33a, and a connecting tube 62 connecting the rear frame 16 and the throttle body 61 to each other.

An intake air passage 63 formed by the connecting tube 62 and the throttle body 61 linearly extends from the rear frame 16 forwardly downward above the cross frame 21, and is connected to the cylinder head 33a.

The rear frame 16 houses a battery 64 that supplies power to the engine 10 and the like.

The rear suspension 29 is disposed between the other-side exhaust pipe 37 and the rear frame 16 in a forward-rearward direction and below the intake air passage 63.

Figure 4:
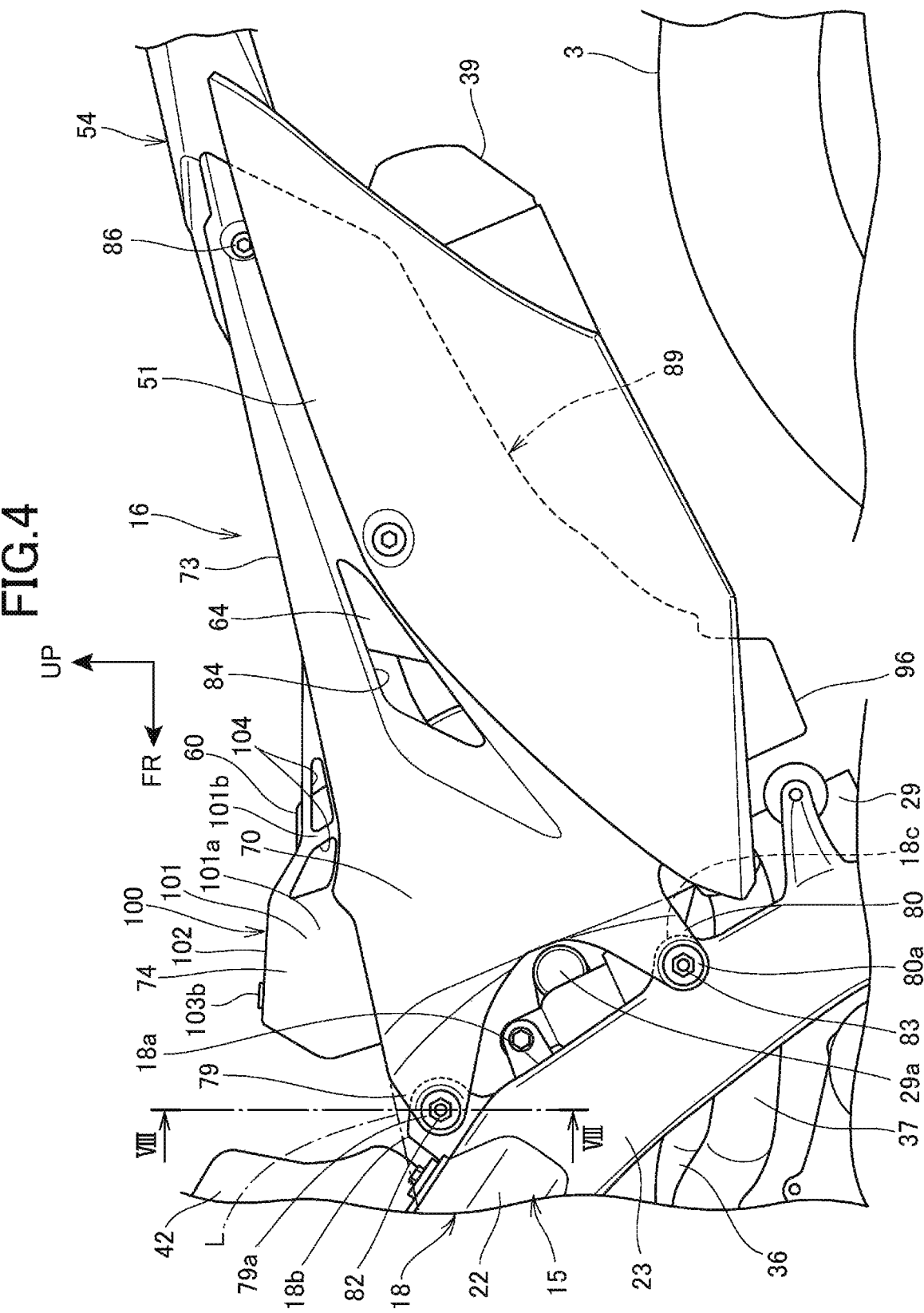
FIG. 4 is a left side view of a rear frame and portions around the rear frame.
Figure 5:
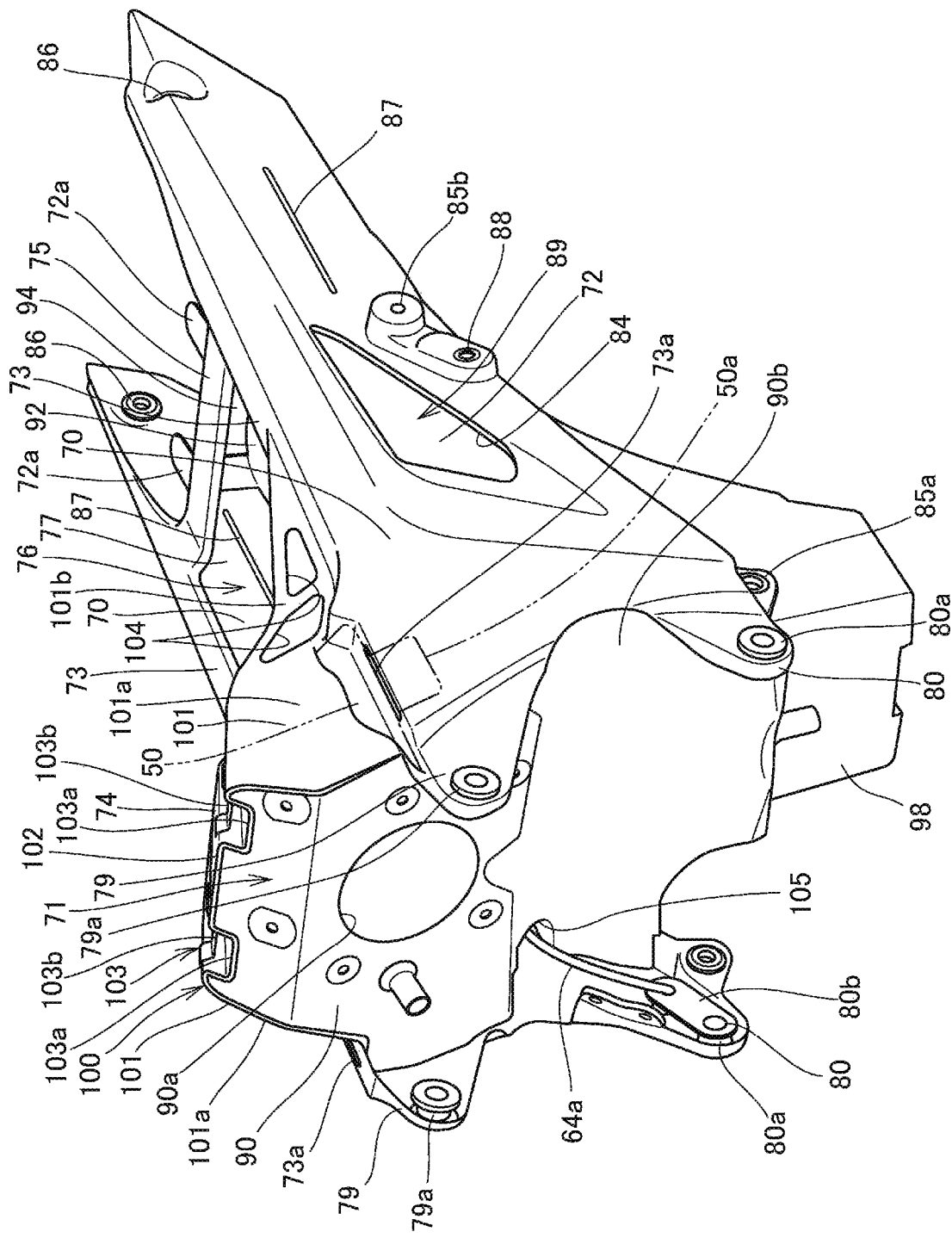
FIG. 5 is a perspective view of the rear frame as viewed from a front side.
Figure 6:
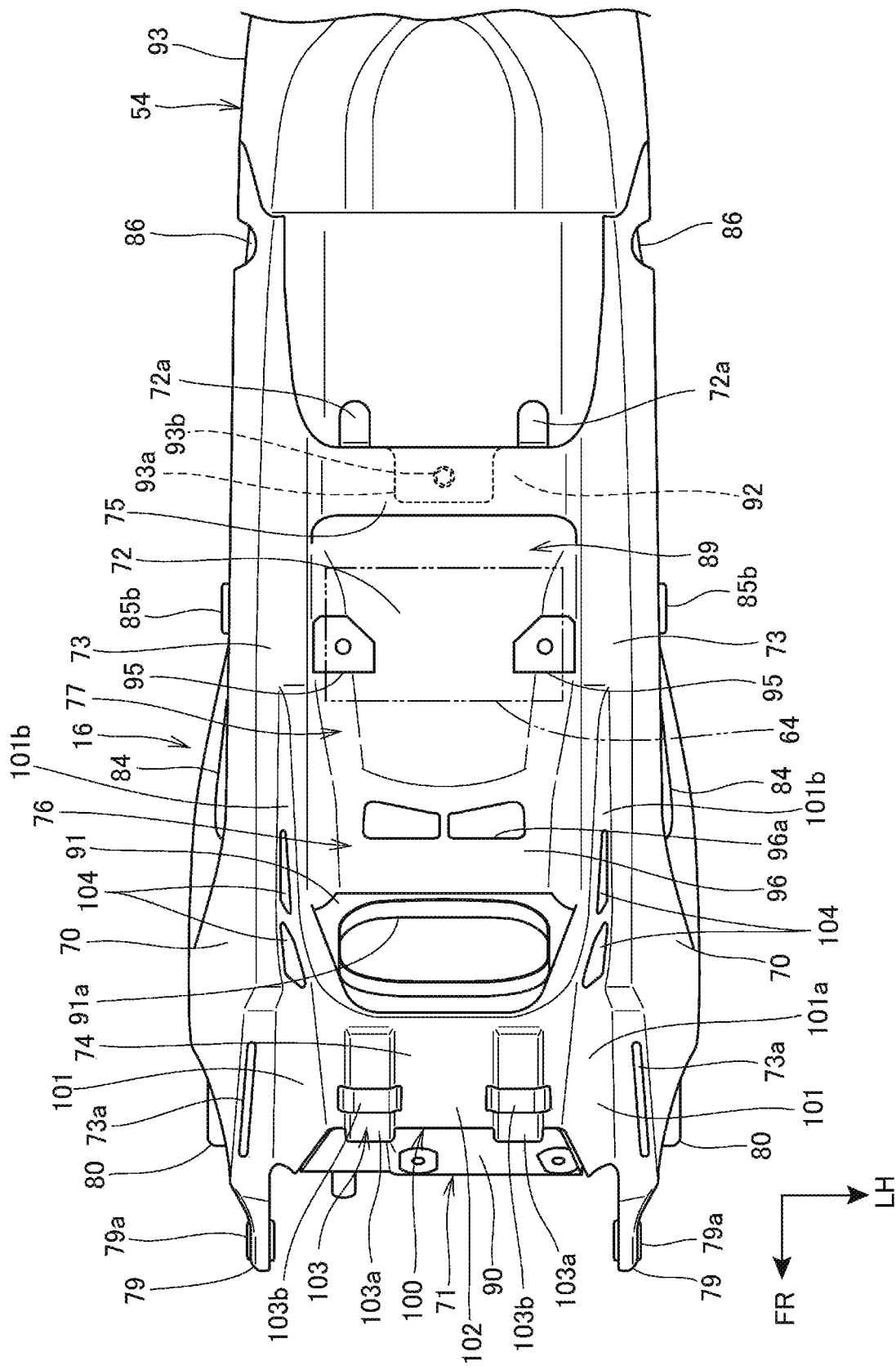
FIG. 6 is a plan view of the rear frame and a rear fender as viewed from above.
Figure 7:
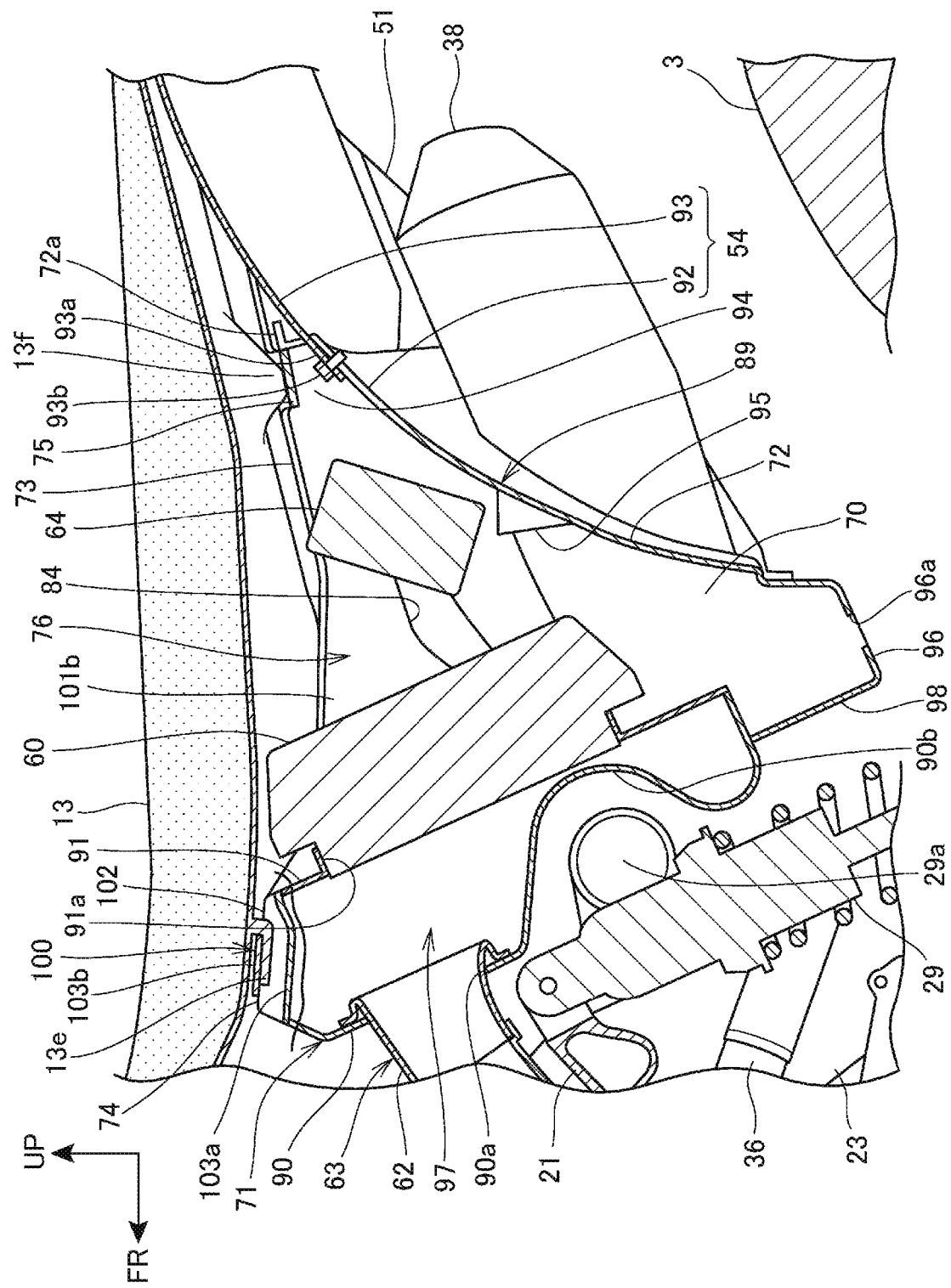
FIG. 7 is an enlarged sectional view of the rear frame and portions around the rear frame in FIG. 3.

FIG. 4 is a left side view of the rear frame 16 and portions around the rear frame 16. FIG. 5 is a perspective view of the rear frame 16 as viewed from the front side. FIG. 6 is a plan view of the rear frame 16 and the rear fender 54 as viewed from above. FIG. 7 is an enlarged sectional view of the rear frame 16 and portions around the rear frame 16 in FIG. 3. Here, FIG. 4 illustrates a state in which the seat 13, the radiator shrouds 50, the intake air passage 63, and the like are removed.

Referring to FIGS. 4 to 7, the rear frame 16 is a frame formed in the shape of a box having a space therewithin. The whole of parts forming the box shape is formed of a fiber reinforced resin.

The fiber reinforced resins constituting the rear frame 16, the radiator shrouds 50, and the side covers 51 are carbon fiber reinforced plastic (CFRP) as an example.

CFRP is a composite material made of a carbon fiber and a resin, and is for example obtained by impregnating cloth woven from a warp and a weft made by bundling carbon fibers with a resin, and heating and curing the cloth impregnated with the resin. A thermosetting resin is suitable as the resin.

The fiber reinforced resins are not limited to CFRP, but FRP (fiber reinforced plastic) using another kind of fiber may be used.

The rear frame 16 includes a pair of left and right side walls 70 arranged so as to be spaced apart in the vehicle width direction (left-right direction), a front wall 71 disposed in a front portion of the rear frame 16 and between the side walls 70, and a rear wall 72 disposed in a rear portion of the rear frame 16 and coupling the side walls 70 to each other in the vehicle width direction.

The rear frame 16 also includes a pair of left and right upper side portions 73 that extend inward in the vehicle width direction from upper edges of the side walls 70, a front cross member 74 (cross member) that is disposed in the front portion of the rear frame 16 and couples the upper side portions 73 to each other in the vehicle width direction, and a rear cross member 75 that is disposed in the rear portion of the rear frame 16 and couples the upper side portions 73 to each other in the vehicle width direction.

The side walls 70, the front wall 71, a wall member 89 to be described later, the upper side portions 73, the front cross member 74, and the rear cross member 75 are formed of a fiber reinforced resin.

The rear frame 16 includes an internal space 76 (air chamber) enclosed by the side walls 70, the front wall 71, and the rear wall 72. An upper surface opening 77 that makes the internal space 76 open upward is formed between the front cross member 74 and the rear cross member 75 in an upper surface of the rear frame 16. The upper surface opening 77 is demarcated by a rear edge of the front cross member 74, a front edge of the rear cross member 75, and inner edges in the vehicle width direction of the upper side portions 73.

As viewed from a side, the side walls 70 are formed in a longitudinally long plate shape, and are formed so as to decrease vertical width thereof toward the rear side. As viewed from the side, upper edges and lower edges of the side walls 70 are inclined rearwardly upward.

The side walls 70 have a pair of left and right upper side attaching portions 79 (attaching portions) at upper portions of front end portions of the side walls 70, the upper side attaching portions 79 extending in the shape of an arm forwardly of the front wall 71. Cylindrical metallic collars 79a penetrating the upper side attaching portions 79 in the vehicle width direction are fitted into the upper side attaching portions 79.

The side walls 70 also have a pair of left and right lower side attaching portions 80 (coupling portions) at the front end portions and below the upper side attaching portions 79, the lower side attaching portions 80 extending in the shape of an arm forwardly of the front wall 71. Cylindrical metallic collars 80a penetrating the lower side attaching portions 80 in the vehicle width direction are fitted into the lower side attaching portions 80.

The upper side attaching portions 79 and the lower side attaching portions 80 are coupling portions that couple the rear frame 16 to the main frames 18.

Figure 8:
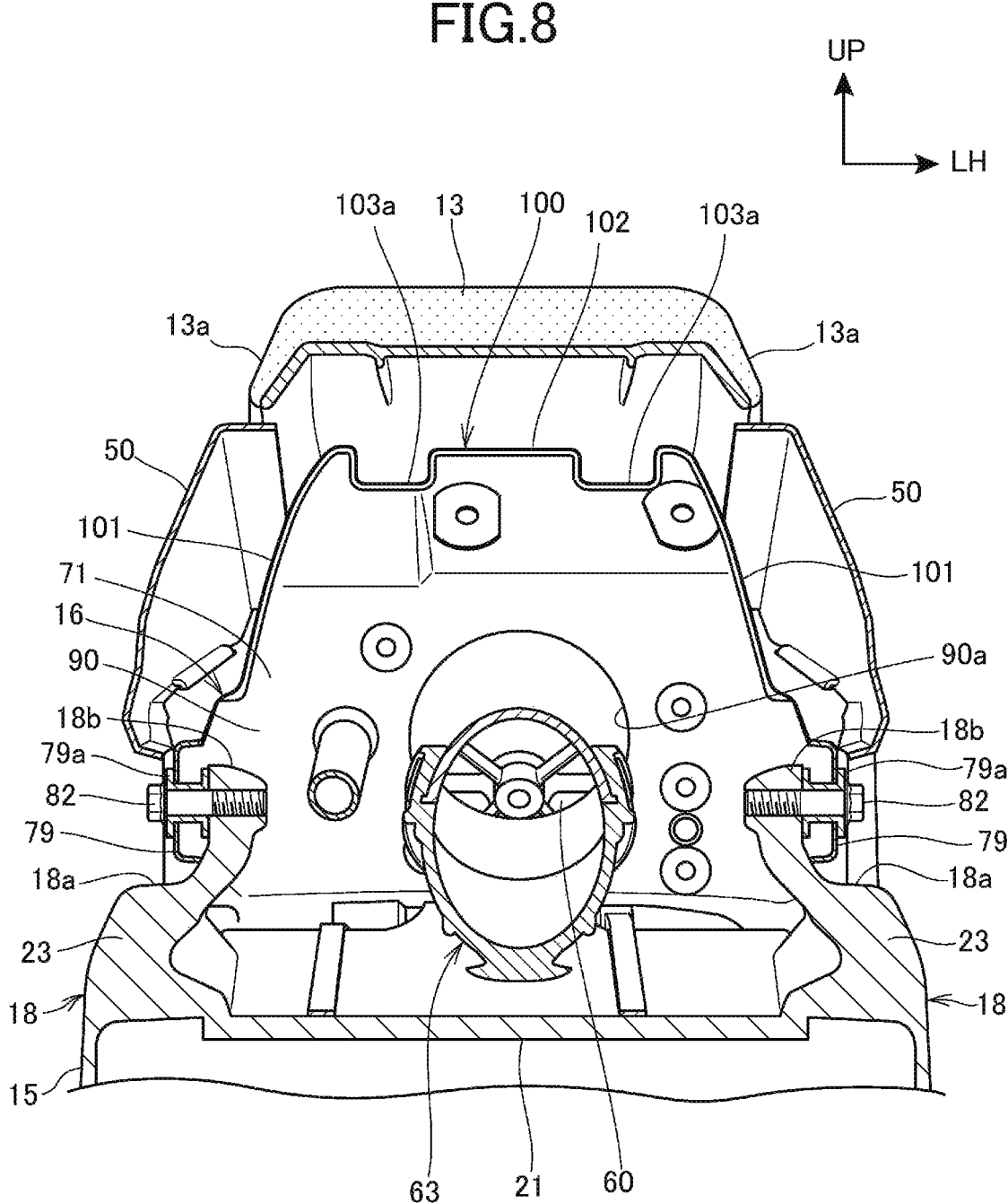
FIG. 8 is a sectional view taken along a line VIII-VIII of FIG. 4.

FIG. 8 is a sectional view taken along a line VIII-VIII of FIG. 4. Incidentally, FIG. 8 also illustrates the seat 13 and the radiator shrouds 50.

Referring to FIG. 4 and FIG. 8, the main frames 18 have rear surface portions 18a inclined rearwardly downward as viewed from the side. The rear surface portions 18a are provided with upper side stays 18b and lower side stays 18c to which the rear frame 16 is attached.

The pair of left and right upper side stays 18b extends rearwardly upward from the rear surface portions 18a of the upper end portions of the pivot frames 23. The pair of left and right lower side stays 18c is located rearwardly downward of the upper side stays 18b, and extends rearwardly upward from the rear surface portions 18a.

The rear frame 16 is coupled to the main frames 18 by fastening the upper side attaching portions 79 to the upper side stays 18b by fixing bolts 82, and fastening the lower side attaching portions 80 to the lower side stays 18c by fixing bolts 83.

The upper side attaching portions 79 extend out forwardly of the lower side attaching portions 80 so as to correspond to the positions of the upper side stays 18b.

Specifically, the upper side attaching portions 79 are arranged outside the upper side stays 18b in the vehicle width direction, and are fastened to the upper side stays 18b by the fixing bolts 82 inserted into the collars 79a from the outside in the vehicle width direction.

In addition, the lower side attaching portions 80 are arranged outside the lower side stays 18c in the vehicle width direction, and are fastened to the lower side stays 18c by the fixing bolts 83 inserted into the collars 80a from the outside in the vehicle width direction.

Axial forces of fastening by the fixing bolts 82 and the fixing bolts 83 are received by the metallic collars 79a and the metallic collars 80a. Thus, even the rear frame 16 made of a fiber reinforced resin is securely fixed to the main frames 18.

As viewed from the side in FIG. 1, the fixing bolts 82 for the upper side attaching portions 79 are located between the engine hanger 30 and the pivot shaft 28 in the forward-rearward direction, and are located above the engine hanger 30. In addition, the fixing bolts 82 are located in front of and above the fixing bolts 83 for the lower side attaching portions 80.

Referring to FIGS. 4 to 7, the side walls 70 of the rear frame 16 include a pair of left and right side surface intake ports 84 that make the internal space 76 communicate with the outside, cover fixing portions 85a to which front portions of the side covers 51 are fastened, cover fixing portions 85b to which rear portions of the side covers 51 are fastened, a pair of left and right seat fixing portions 86 to which a rear end portion of the seat 13 is fastened, and a pair of left and right recessed portions 87 into which the rear portions of the side covers 51 are fitted.

In addition, the side wall 70 on the left side has a muffler fixing portion 88 to which the other-side muffler 39 is fastened, and the side wall 70 on the right side has a muffler fixing portion (not depicted) to which the one-side muffler 38 is fastened. These left and right muffler fixing portions 88 are formed by partly embedding a material having high heat resistance in members constituting bases (main bodies) of the side walls 70. This can reduce an effect of heat of the one-side muffler 38 and the other-side muffler 39 on the rear frame 16.

The recessed portions 87 are formed in a groove shape by recessing outer surfaces of the side walls 70 inward in the vehicle width direction. The recessed portions 87 extend in the forward-rearward direction between the cover fixing portions 85b and the seat fixing portions 86. Upper edge portions of the rear portions of the side covers 51 are fitted and locked in the recessed portions 87.

The front wall 71 of the rear frame 16 includes an outside front wall portion 90 constituting a front surface of the rear frame 16, and an inside front wall portion 91 disposed inside the rear frame 16 so as to be spaced rearward from the outside front wall portion 90. The outside front wall portion 90 and the inside front wall portion 91 are arranged between front portions of the left and right side walls 70.

An intake air passage connecting port 90a to which a rear end portion of the connecting tube 62 is fitted and connected is formed in an upper portion of the outside front wall portion 90. A cushion clearance portion 90b recessed rearward so as to avoid a reservoir tank 29a of the rear suspension 29 is formed in the outside front wall portion 90 and below the intake air passage connecting port 90a.

The reservoir tank 29a is exposed leftward from between the upper side attaching portion 79 and the lower side attaching portion 80 on the left side. This allows access to a damping characteristic adjusting unit of the rear suspension 29, the damping characteristic adjusting unit being disposed in the reservoir tank 29a.

The inside front wall portion 91 has a vent hole 91a penetrating the inside front wall portion 91. The air cleaner element 60 is attached to a rear surface of the inside front wall portion 91, and closes the vent hole 91a.

An air flowing into the internal space 76 from the outside of the rear frame 16 is cleaned by passing through the air cleaner element 60, and flows into the intake air passage 63 through a space between the inside front wall portion 91 and the outside front wall portion 90. That is, the internal space 76 is a dirty side where the air before being cleaned flows, and the space between the inside front wall portion 91 and the outside front wall portion 90 is a clean side 97 where the cleaned air flows.

The rear wall 72 of the rear frame 16 is formed by a plate-shaped wall member 89 interposed between rear portions and lower portions of the left and right side walls 70. The wall member 89 integrally includes the rear wall 72, a bottom wall 96 extending forward from a lower end of the rear wall 72, and a lower front wall 98 extending upward from a front end of the bottom wall 96 and connected to a lower end portion of the outside front wall portion 90.

The wall member 89 is coupled by bonding to inner surfaces in the vehicle width direction of the left and right side walls 70. The bottom wall 96 and the lower front wall 98 demarcate a lower portion of the internal space 76. The bottom wall 96 has a bottom surface opening 96a opening downward.

The rear wall 72 of the rear frame 16 is located above the rear wheel 3, and is formed rearwardly upward so as to be along the shape of a front upper surface of the rear wheel 3 as viewed from the side.

The rear fender 54 includes a rear fender front portion 92 (FIG. 7) formed by a rear portion of the rear wall 72, and a rear fender rear portion 93 attached to an upper portion of a rear portion of the rear fender front portion 92 and extending rearward. The rear fender rear portion 93 is formed of a resin such as polypropylene or the like.

Specifically, the rear fender rear portion 93 is disposed below the plate-shaped rear cross member 75 and disposed so as to be superposed from above onto the rear portion of the rear wall 72. A front portion 93a of the rear fender rear portion 93 is fixed to the rear wall 72 by a fender fixing bolt 93b inserted from above.

The rear cross member 75 is disposed so as to be spaced above from the rear fender front portion 92, which is the rear portion of the rear wall 72. An outside air introducing passage 94 that makes the internal space 76 communicate with the outside in the rear is formed between the rear fender front portion 92 and the rear cross member 75.

The rear wall 72 has a plurality of projecting pieces 72a in the vehicle width direction, the projecting pieces 72a extending upward from an upper edge portion of the rear wall 72, the upper edge portion being located below the rear cross member 75. The projecting pieces 72a are connected to a rear edge portion of the rear cross member 75 to support the rear cross member 75.

A plurality of stay fixing portions 95 are arranged in front of the rear cross member 75 and on a front portion of the rear wall 72. The battery 64 is supported within the internal space 76 by battery stays (not depicted) fastened to the stay fixing portions 95. The stay fixing portions 95 are formed by members separate from the rear wall 72, and are coupled by bonding to an upper surface portion of the rear wall 72.

As viewed from the side, the upper side portions 73 of the rear frame 16 are linearly inclined rearwardly upward from the upper side attaching portions 79, and extend to a rear end portion of the rear frame 16. As viewed from the side, the upper side portions 73 coincide with the upper edges of the side walls 70. The upper side portions 73 function as reinforcing ribs for the side walls 70.

As depicted in FIG. 1 and FIG. 2, lower edges of both end portions in the vehicle width direction of the seat 13 include front lower edges 13b extending rearwardly downward along rear portions of upper edges of the radiator shrouds 50 and rear lower edges 13c extending rearwardly upward along upper surfaces of the upper side portions 73. The upper side portions 73 are formed so as to face the rear lower edges 13c from below. That is, the upper side portions 73 are parts linearly extending rearwardly upward along the rear lower edges 13c of the seat 13.

In addition, the upper side portions 73 extend to the rear rearwardly upward so as to be continuous with upper edges of the upper side attaching portions 79 of the rear frame 16. As viewed from the side, the collars 79a and the fixing bolts 82 are located below an extension L (FIG. 4) extending frontward from the upper side portions 73 along the upper side portions 73.

Slits 73a (FIG. 5 and FIG. 6) extending in the forward-rearward direction are formed in parts of the upper side portions 73, the parts being on the sides of the front cross member 74.

The front cross member 74 constitutes a bulging portion 100 bulging above the upper side portions 73.

The bulging portion 100 includes a pair of left and right bulging portion side walls 101 (side wall portions) that extend upward from inner edges in the vehicle width direction of front portions of the upper side portions 73, and a bulging portion top wall 102 that couples upper edges of front portions of the bulging portion side walls 101 to each other in the vehicle width direction.

The bulging portion side walls 101 include front side wall portions 101a demarcating the clean side 97 and rear side wall portions 101b located above the internal space 76. The bulging portion top wall 102 couples the front side wall portions 101a to each other in the vehicle width direction.

A front plane of the bulging portion 100 is closed by the upper portion of the outside front wall portion 90. A rear plane of a space enclosed by the front side wall portions 101a and the bulging portion top wall 102 is closed by an upper portion of the inside front wall portion 91. That is, the bulging portion 100 constitutes an upper portion of the clean side 97. A large volume of the clean side 97 is thereby secured.

A locking portion 103 locking the seat 13 is disposed on the bulging portion top wall 102. The locking portion 103 includes a pair of left and right groove portions 103a extending longitudinally on the bulging portion top wall 102, and a pair of left and right plate-shaped locking pieces 103b fixed to an upper surface of the bulging portion top wall 102 so as to cross the groove portions 103a in the vehicle width direction.

Openings 104 penetrating the rear side wall portions 101b of the bulging portion 100 are formed in the rear side wall portions 101b.

As depicted in FIG. 5, a wiring through hole 105 is formed in a side portion of the outside front wall portion 90. A ground wire 64a of the battery 64 disposed in the internal space 76 is drawn out to the front of the outside front wall portion 90 through the wiring through hole 105.

The collar 80a of the lower side attaching portion 80 on the right side has a plate-shaped connecting portion 80b extending rearward. The collar 80a, the connecting portion 80b, and the fixing bolt 83 are formed of a conductive metal.

The connecting portion 80b is disposed on the inside in the vehicle width direction of the lower side attaching portion 80, and is covered from the outside by the lower side attaching portion 80. An end portion of the ground wire 64a is connected to the connecting portion 80b. The ground wire 64a is thereby electrically connected to the main frame 18 via the connecting portion 80b and the collar 80a. The ground wire 64a can therefore be connected to the metallic front frame 15 by a simple structure.

As depicted in FIG. 3, a lower surface of a front end portion of the seat 13 abuts against a rear upper surface of the fuel tank 42, and a locking piece 13d on the lower surface of the front end portion of the seat 13 is locked to a locking portion 42a on the rear upper surface of the fuel tank 42. The seat 13 is thereby supported by the fuel tank 42.

In addition, a lower portion of a longitudinally intermediate portion of the seat 13 abuts against the bulging portion top wall 102 of the bulging portion 100 of the rear frame 16, and locking portions 13e on the lower portion of the longitudinally intermediate portion of the seat 13 are locked to the locking portion 103 of the bulging portion 100. The seat 13 is thereby supported by the bulging portion 100. Specifically, the locking portions 13e are formed in a pawl shape extending frontward, and are inserted from the rear between the locking pieces 103b (FIG. 5) and the groove portions 103a (FIG. 5). Incidentally, FIG. 3 and FIG. 7 illustrate a section of a part of one groove portion 103a in an upper portion of the bulging portion 100.

Further, a receiving portion 13f (FIG. 3) on a lower surface of a rear portion of the seat 13 abuts against the rear cross member 75 of the rear frame 16 from above. The seat 13 is thereby supported by the rear cross member 75.

In addition, as depicted in FIG. 1, the seat 13 is fixed to the rear frame 16 by seat fixing bolts 13g (FIG. 1), which are inserted through the rear end portion of the seat 13 and fastened to the seat fixing portions 86 (FIG. 6).

The seat 13 is thus supported over a longitudinally wide range by the fuel tank 42, the bulging portion 100, and the rear cross member 75. Therefore, the driver can appropriately input a load (weight) for operating the motorcycle 1 to the vehicle body via the seat 13.

In the present embodiment, the rear frame 16 supports the seat 13 by the bulging portion 100 that bulges above the upper side portions 73. Thus, the seat 13 can be supported at an appropriate height position, and the upper side attaching portions 79 that do not directly support the seat 13 can be disposed at a lower position. Because the main frames 18 extend rearwardly downward, the more the position of the upper side attaching portions 79 is lowered, the more a distance between the upper side attaching portions 79 and the main frames 18 can be reduced in the forward-rearward direction. Therefore, the upper side attaching portions 79 and the upper side stays 18b can be reduced in size, and reduced in weight.

An air (outside air) is taken into the internal space 76 of the rear frame 16 from the upper surface opening 77, the side surface intake ports 84, the outside air introducing passage 94, and the openings 104 of the bulging portion 100. A good air intake efficiency is therefore achieved.

Because the internal space 76 of the rear frame 16 is used as a dirty side, a large volume of the internal space 76 can be secured as compared with a constitution in which an air cleaner box is provided as an additional member within the rear frame 16. A good air intake efficiency is therefore achieved.

In addition, because the rear frame 16 has the bulging portion 100, the intake air passage connecting port 90a can be disposed at a high position, and the intake air passage 63 (FIG. 3) can be linearly disposed forwardly downward toward the intake port of the rear surface of the cylinder head 33*a*. Therefore, an intake air can be made to flow smoothly, and a good air intake efficiency is achieved.

In addition, because the front wall 71 of the rear frame 16 includes the outside front wall portion 90 and the inside front wall portion 91, the clean side 97 can be formed between the outside front wall portion 90 and the inside front wall portion 91.

The side walls 70 of the rear frame 16 are exposed to the outside, and are disposed so as to be continuous with upper edges of the side covers 51. The side walls 70 of the rear frame 16 constitute some of exterior parts visually recognized from the outside. It is therefore possible to reduce the number of exterior parts, and achieve weight reduction.

Referring to FIG. 1 and FIG. 5, the radiator shrouds 50 have locking pieces 50*a* extending downward from lower edges of rear end portions of the radiator shrouds 50. The rear end portions of the radiator shrouds 50 are arranged between the front lower edges 13*b* of the seat 13 and the upper side portions 73. The radiator shrouds 50 cover the bulging portion side walls 101 of the bulging portion 100 from the outside.

The rear end portions of the radiator shrouds 50 are positioned with respect to the rear frame 16 when the locking pieces 50*a* are fitted into the slits 73*a* of the rear frame 16. The rear end portions of the radiator shrouds 50 are smoothly continuous with the side surface portions 13*a* of the seat 13 and the side walls 70 of the rear frame 16. Because the radiator shrouds 50 can be thus positioned with respect to the rear frame 16 by the locking pieces 50*a*, the radiator shrouds 50 and the rear frame 16 can be made continuous with each other by a simple structure. In addition, the bulging portion 100 can be concealed by the rear end portions of the radiator shrouds 50, so that good external appearance quality is obtained.

As described above, according to an embodiment to which the present invention is applied, the motorcycle 1 includes the main frames 18 formed by coupling the main tubes 22 extending rearwardly downward from the head pipe 17 supporting the front wheel 2 via the front fork 11 to the pivot frames 23 supporting the rear fork 12 by the rear end portions of the pivot frames 23, and the rear frame 16 in the rear of the main frames 18, the rear frame 16 being formed of a fiber reinforced resin and supporting the seat 13. The rear frame 16 includes the upper side attaching portions 79 attached to the main frames 18, the pair of left and right upper side portions 73 linearly extending rearward from the upper side attaching portions 79, and the front cross member 74 laterally coupling the upper side portions 73 to each other. The front cross member 74 includes the bulging portion 100 bulging above the upper side portions 73. Thus, the seat 13 can be supported well by the bulging portion 100 bulging above the upper side portions 73. Further, because the bulging portion 100 supports the seat 13, the position of the upper side attaching portions 79 can be lowered, and the upper side attaching portions 79 come closer to the main frames 18. It is therefore possible to miniaturize the upper side attaching portions 79 and the upper side stays 18*b* on the side of the main frames 18, to which the upper side attaching portions 79 are attached.

In addition, the inside of the rear frame 16 constitutes the air chamber of the engine 10. Thus, there is no need to provide a dedicated member for forming the air chamber. It is therefore possible to simplify the structure, and secure a large volume of the air chamber.

In addition, the locking portion 103 locking the seat 13 is disposed on an upper surface of the bulging portion 100. Thus, the seat 13 can be supported and locked by the bulging portion 100, so that the seat 13 can be fixed with a simple structure.

Further, the rear frame 16 includes the pair of left and right side walls 70 and the front wall 71 disposed between the side walls 70, and the intake air passage 63 coupled to the engine 10 and the air cleaner element 60 are attached to the front wall 71. Thus, the intake air passage 63 and the air cleaner element 60 can be attached with a simple structure using the front wall 71.

In addition, the openings 104 making the inside and outside of the rear frame 16 communicate with each other are formed in the bulging portion side walls 101 of the bulging portion 100. Thus, an air can be taken into the air chamber from the openings 104, so that air intake efficiency can be improved.

In addition, the collar 80*a* formed of a conductive metal is disposed in the lower side attaching portion 80 as a coupling portion coupling the rear frame 16 and one main frame 18 to each other, and the collar 80*a* has the connecting portion 80*b* to which the ground wire 64*a* of the battery 64 included in the rear frame 16 is connected. Therefore, even in the constitution in which the battery 64 is included in the rear frame 16 made of a fiber reinforced resin, the ground wire 64*a* can be connected to a conductive part by a simple structure, by connecting the ground wire 64*a* to the metallic collar 80*a* disposed in the lower side attaching portion 80.

In addition, the slits 73*a* are arranged in the front portions of the upper side portions 73, and the locking pieces 50*a* extending from the radiator shrouds 50 are fitted in the slits 73*a*. Thus, the radiator shrouds 50 can be supported by the rear frame 16 with a simple constitution.

Further, the rear frame 16 includes the rear wall 72 laterally coupling the rear portions of the side walls 70 to each other, the rear wall 72 constitutes the front portion of the rear fender 54 and is provided with the rear fender rear portion 93 extending rearward from the upper portion of the rear wall 72, the rear cross member 75 laterally coupling the upper side portions 73 to each other is disposed at a position spaced above from the rear wall 72, and the outside air introducing passage 94 is formed between the rear wall 72 and the rear cross member 75. Thus, the structure can be simplified by making the rear wall 72 have the function of a rear fender, and rigidity of the rear frame 16 can be improved by the rear wall 72 and the rear cross member 75. Further, an air can be taken into the internal space 76 as the air chamber from the outside air introducing passage 94 between the rear wall 72 and the rear cross member 75, so that air intake efficiency can be improved.

In addition, the slits 73*a* are disposed in parts of the upper side portions 73, the parts being adjacent to, and situated laterally in a vehicle width direction, in relation to the bulging portion 100. Thus, the bulging portion 100 can be covered and concealed by the radiator shrouds 50, so that good external appearance quality is obtained.

It is to be noted that the foregoing embodiment represents one mode of application of the present invention, and that the present invention is not limited to the foregoing embodiment.

In the foregoing embodiment, description has been made supposing that the connecting portion 80*b* to which the ground wire 64*a* is connected is provided to the collar 80*a* of one lower side attaching portion 80. However, the present invention is not limited to this. For example, the connecting portion to which the ground wire 64*a* is connected may be provided to the collar 79*a* of one upper side attaching portion 79 as a coupling portion coupling the rear frame 16 and one main frame 18 to each other.

The foregoing embodiment has been described by taking the motorcycle 1 as an example. However, the present invention is not limited to this. The present invention is applicable to three-wheeled saddle riding type vehicles each having two front wheels or two rear wheels, saddle riding type vehicles each having four wheels or more, and saddle riding type vehicles such as motor scooters and the like.

DESCRIPTION OF REFERENCE SYMBOLS

1 Motorcycle
2 Front wheel
10 Engine
11 Front fork
12 Rear fork
13 Seat
16 Rear frame
17 Head pipe
18, 18 Main frames
22, 22 Main tubes
23, 23 Pivot frames
50, 50 Radiator shrouds
50a, 50a Locking pieces
54 Rear fender
60 Air cleaner element
63 Intake air passage
64 Battery
64a Ground wire
70, 70 Side walls
71 Front wall
72 Rear wall
73, 73 Upper side portions
73a, 73a Slits
74 Front cross member (cross member)
75 Rear cross member
79, 79 Upper side attaching portions (attaching portions)
80 Lower side attaching portion (coupling portion)
80a Collar
80b Connecting portion
93 Rear fender rear portion
94 Outside air introducing passage
100 Bulging portion
101, 101 Bulging portion side walls (side wall portions)
103 Locking portion
104, 104 Openings

The invention claimed is:

1. A vehicle body frame structure for a saddle riding vehicle, the vehicle body frame structure comprising:
a main frame formed by coupling a main tube extending rearwardly downward from a head pipe supporting a front wheel via a front fork to a pivot frame supporting a rear fork by rear end portions of the pivot frame;
a rear frame in a rear of the main frame, the rear frame being formed of a fiber reinforced resin and supporting a seat;
the rear frame including attaching portions attached to the main frame, a pair of left and right upper side portions linearly extending rearward from the attaching portions, and a cross member laterally coupling the upper side portions to each other;
the cross member including a bulging portion bulging above the upper side portions,
wherein an inside of the rear frame constitutes an air inlet chamber for an engine, an air cleaner element is provided inside of the rear frame, and the bulging portion demarcates an upper portion of a clean side where intake air, which has been cleaned by passing through the air cleaner element, flows,
wherein each of the respective upper side portions has a slit formed in a front portion thereof, and wherein a respective locking piece, extending from a radiator shroud, is fitted in each of said slits.

2. The vehicle body frame structure for a saddle riding vehicle according to claim 1, wherein at a rear side of the bulging portion, the rear frame includes an upper surface opening that makes an internal space, which is the air inlet chamber, open upwardly.

3. The vehicle body frame structure for a saddle riding vehicle according to claim 1, wherein a locking portion locking the seat is disposed on an upper surface of the bulging portion.

4. The vehicle body frame structure for a saddle riding vehicle according to claim 1, wherein
an opening, making an inside and an outside of the rear frame communicate with each other, is formed in a side wall portion of the bulging portion.

5. The vehicle body frame structure for a saddle riding vehicle according to claim 1, wherein a collar formed of a conductive metal is disposed in a coupling portion coupling the rear frame and the main frame to each other, and the collar has a connecting portion to which a ground wire of a battery included in the rear frame is connected.

6. The vehicle body frame structure for a saddle riding vehicle according to claim 1, wherein on each of said upper side portions, the slit is disposed adjacent to, and situated laterally in a vehicle width direction, in relation to the bulging portion.

7. The vehicle body frame structure for a saddle riding vehicle according to claim 1, wherein
the rear frame includes a pair of left and right side walls and a front wall disposed between the side walls, and
an intake air passage coupled to the engine and the air cleaner element are attached to the front wall.

8. The vehicle body frame structure for a saddle riding vehicle according to claim 7, wherein the rear frame includes a rear wall laterally coupling rear portions of the side walls to each other, the rear wall constitutes a front portion of a rear fender and is provided with a rear fender rear portion extending rearward from an upper portion of the rear wall, a rear cross member laterally coupling the upper side portions to each other is disposed at a position spaced above from the rear wall, and an outside air introducing passage is formed between the rear wall and the rear cross member.

9. A vehicle body frame structure for a saddle riding vehicle, the vehicle body frame structure comprising:
a main frame formed by coupling a main tube extending rearwardly downward from a head pipe supporting a front wheel via a front fork to a pivot frame supporting a rear fork by rear end portions of the pivot frame;
a rear frame in a rear of the main frame, the rear frame being formed of a fiber reinforced resin and supporting a seat;
the rear frame including attaching portions attached to the main frame, a pair of left and right upper side portions linearly extending rearward from the attaching portions, and a cross member laterally coupling the upper side portions to each other;
the cross member including a bulging portion bulging above the upper side portions,
wherein a collar formed of a conductive metal is disposed in a coupling portion coupling the rear frame and the main frame to each other, and the collar has a connecting portion to which a ground wire of a battery included in the rear frame is connected.

10. A vehicle body frame structure for a saddle riding vehicle, the vehicle body frame structure comprising:
a main frame formed by coupling a main tube extending rearwardly downward from a head pipe supporting a front wheel via a front fork to a pivot frame supporting a rear fork by rear end portions of the pivot frame;
a rear frame in a rear of the main frame, the rear frame being formed of a fiber reinforced resin and supporting a seat;
the rear frame including attaching portions attached to the main frame, a pair of left and right upper side portions linearly extending rearward from the attaching portions, and a cross member laterally coupling the upper side portions to each other;
the cross member including a bulging portion bulging above the upper side portions,
wherein each of the respective upper side portions has a slit formed in a front portion thereof, and a respective locking piece, extending from a radiator shroud, is fitted in each of said slits.

* * * * *